United States Patent
Iwasaki et al.

(10) Patent No.: US 7,212,024 B2
(45) Date of Patent: May 1, 2007

(54) INSPECTION APPARATUS FOR LIQUID CRYSTAL DRIVE SUBSTRATES

(75) Inventors: Yukihiro Iwasaki, Tsuchiura (JP);
Yutaka Nagasawa, Tokyo (JP);
Yoshikazu Yoshimoto, Matsusaka (JP)

(73) Assignees: Ishikawajima-Harima Heavy Industries Co., Ltd.; Sharp Kabushiki Kaisha (JP)

( * ) Notice: Subject to any disclaimer, the term of this patent is extended or adjusted under 35 U.S.C. 154(b) by 0 days.

(21) Appl. No.: 10/952,375

(22) Filed: Sep. 28, 2004

(65) Prior Publication Data

US 2005/0068057 A1    Mar. 31, 2005

Related U.S. Application Data

(63) Continuation of application No. 10/258,972, filed as application No. PCT/JP02/02014 on Mar. 5, 2002, now Pat. No. 6,798,231.

(30) Foreign Application Priority Data

Mar. 5, 2001    (JP)    ............... 2001-059876

(51) Int. Cl.
*G01R 31/02*    (2006.01)
*G01R 31/302*    (2006.01)

(52) U.S. Cl. .................. 324/770; 324/753; 438/16
(58) Field of Classification Search .................. None
See application file for complete search history.

(56) References Cited

U.S. PATENT DOCUMENTS 4,983,911 A * 1/1991 Henley .................. 324/753
5,235,272 A * 8/1993 Henley .................. 324/770
5,285,150 A * 2/1994 Henley et al. .............. 324/770
5,391,985 A * 2/1995 Henley .................... 324/158.1

(Continued)

FOREIGN PATENT DOCUMENTS

JP    4-107946    4/1992

(Continued)

*Primary Examiner*—Ernest Karlsen
(74) *Attorney, Agent, or Firm*—Ostrolenk, Faber, Gerb, & Soffen, LLP

(57) ABSTRACT

The object of the present invention is to provide an inspection apparatus for liquid crystal drive substrates that improves the inspection accuracy of liquid crystal drive substrates, judges defect type more accurately, and does not cause a decrease in throughput. In order to achieve this object, the present invention provides an inspection apparatus for liquid crystal drive substrates that discriminates defective pixels having an abnormal voltage and normal pixels having a normal voltage based on pixel voltage by arranging an electro-optical element plate in opposition to a liquid crystal drive substrate on which pixel electrodes are arranged in the form of a matrix, and calculating the actual voltage of each pixel electrode in the form of a pixel voltage based on the voltage image of the electro-optical element plate obtained by writing a prescribed voltage to the pixel electrodes, and on the electro-optical characteristics of the above electro-optical element plate, wherein the inspection apparatus comprises an image processing apparatus that an image processing apparatus that classifies pixel electrodes of defect candidates for each defect type by comparing said pixel voltage with a threshold value set for each defect type of pixel defect, and finally judges said pixel electrodes of defect candidates for each defect type as defective pixels of each defect type based on judgment conditions provided for each defect type.

2 Claims, 13 Drawing Sheets

U.S. PATENT DOCUMENTS

| | | | | |
|---|---|---|---|---|
| 5,432,461 A | * | 7/1995 | Henley | 324/770 |
| 5,444,385 A | * | 8/1995 | Henley | 324/752 |
| 5,459,409 A | * | 10/1995 | Henley | 324/770 |
| 5,459,410 A | * | 10/1995 | Henley | 324/770 |
| 5,465,052 A | * | 11/1995 | Henley | 324/770 |
| 5,504,438 A | * | 4/1996 | Henley | 324/770 |
| 5,543,729 A | * | 8/1996 | Henley | 324/770 |
| 5,570,011 A | * | 10/1996 | Henley | 324/158.1 |
| 5,639,390 A | | 6/1997 | Iino et al. | |
| 5,719,648 A | * | 2/1998 | Yoshii et al. | 349/42 |
| 5,740,272 A | | 4/1998 | Shimada | |
| 5,844,199 A | | 12/1998 | Iino et al. | |
| 6,043,923 A | * | 3/2000 | Lee | 359/245 |
| 6,177,955 B1 | * | 1/2001 | Downen et al. | 348/189 |

FOREIGN PATENT DOCUMENTS

| | | |
|---|---|---|
| JP | 5-256794 | 10/1993 |
| JP | 8-21803 | 1/1996 |
| JP | 8-304852 | 11/1996 |
| JP | 11-174397 | 7/1999 |

* cited by examiner

FIG. 8

| SETTING EXAMPLE/SET VALUE | POINT DEFECT | GATE LINE DEFECTS | | DATA LINE DEFECTS | | MURA DEFECT |
|---|---|---|---|---|---|---|
| | | SHORT | OPEN | SHORT | OPEN | |
| THRESHOLD VALUE Em (MURA DEFECT) | ○ | ○ | ○ | ○ | ○ | ○ |
| THRESHOLD VALUE Eds (DATA SHORTED LINE DEFECT) | ○ | ○ | ○ | ○ | ○ | × |
| THRESHOLD VALUE Egs (GATE SHORTED LINE DEFECT) | ○ | ○ | ○ | × | ○ | × |
| THRESHOLD VALUE Et (POINT DEFECT, CLUSTER DEFECT) | ○ | × | ○ | × | ○ | × |
| THRESHOLD VALUE Edo (DATA OPEN LINE DEFECT) | × | × | ○ | × | × | × |
| THRESHOLD VALUE Ego (GATE OPEN LINE DEFECT) | × | × | × | × | × | × |

LARGE VOLTAGE ↔ SMALL VOLTAGE

FIG. 9

| PIXEL ELECTRODE | PIXEL VOLTAGE | DEFECT CANDIDATE | MURA DEFECT CANDIDATE | DS LINE DEFECT CANDIDATE | GS LINE DEFECT CANDIDATE | POINT DEFECT CANDIDATE | DO LINE DEFECT CANDIDATE | GO LINE DEFECT CANDIDATE |
|---|---|---|---|---|---|---|---|---|
| a11 | (2-BYTE DATA) | 0 | 0 | 0 | 0 | 0 | 0 | 0 |
| a12 | | 0 | 0 | 0 | 0 | 0 | 0 | 0 |
| a13 | | 1 | 0 | 0 | 0 | 0 | 1 | 1 |
| ... | ... | ... | ... | ... | ... | ... | ... | ... |
| a21 | | 1 | 0 | 1 | 1 | 1 | 1 | 1 |
| a22 | | 0 | 0 | 0 | 0 | 0 | 0 | 0 |
| a23 | | 1 | 0 | 0 | 1 | 1 | 1 | 1 |
| ......... | ......... | ......... | ......... | ......... | ......... | ......... | ......... | ......... |

FIG. 11

GATE OPEN LINE DEFECTS — ROW DIRECTION →

COLUMN DIRECTION ↓

| O | O | O | O | O | O | O | O | O | O | X | O |
|---|---|---|---|---|---|---|---|---|---|---|---|
| O | O | O | O | O | O | O | X | O | O | X | O |
| O | O | O | O | O | O | O | O | O | O | X | O |
| O | O | O | O | O | O | O | O | O | O | X | O |
| O | O | O | O | O | O | O | O | O | O | X | O |
| O | O | O | O | O | O | O | O | O | O | O | O |
| O | O | O | O | O | O | O | O | O | O | O | O |
| O | O | O | O | O | O | O | O | O | O | O | O |
| O | X | O | O | X | O | O | X | O | O | O | O |
| O | O | O | O | O | O | O | O | O | O | O | O |
| O | O | O | O | X | O | O | O | O | O | O | O |

FIG. 13

INSPECTION APPARATUS FOR LIQUID CRYSTAL DRIVE SUBSTRATES

CROSS REFERENCE TO RELATED APPLICATIONS

This application is a continuation of U.S. patent application Ser. No. 10/258,972, filed Oct. 29, 2002 entitled "INSPECTION APPARATUS FOR LIQUID CRYSTAL DRIVE SUBSTRATES" now U.S. Pat. No. 6,798,231, which is a 371 of PCT/JP02/02014 filed Mar. 5, 2002 and is related to and claims priority to Japanese Application Serial No. 2001-059876 dated Mar. 5, 2001.

TECHNICAL FIELD

The present invention relates to an inspection apparatus for liquid crystal drive substrates that uses an electric field to drive liquid crystal sealed on a flat surface in a liquid crystal display panel.

BACKGROUND ART

As is commonly known, liquid crystal display panels are comprised of arranging opposing glass plates in which liquid crystal is sealed on a liquid crystal drive substrate that applies an electric field to the liquid crystal. This liquid crystal display panel regulates the electrical field applied to the liquid crystal by controlling the data voltage applied pixel electrodes of the liquid crystal drive substrate, and displays images by controlling the optical transmittance of the liquid crystal by this regulation of the electric field.

Liquid crystal drive substrates for such liquid crystal display panels are provided with a plurality of pixel electrodes arranged in the form of a matrix on a glass substrate, and together with supplying a data voltage to these plurality of pixel electrodes by the data lines, are composed so that, together with providing TFT and other switching elements between the data lines and pixel electrodes, the TFT elements are controlled according to a gate voltage supplied by the gate lines. Namely, writing of the data voltage to the pixel electrodes is controlled by the data voltage supplied to the TFT by the data lines, and the gate voltage supplied to the TFT by the gate lines. By arranging liquid crystal drive substrates composed in this manner in opposition and in close proximity to each other on a liquid crystal plate, the electrical field resulting from the voltage that is substantially applied to and held in the pixel electrodes (pixel voltage) acts on the liquid crystal resulting in the display of images on the surface of the liquid crystal plate.

For example, the electro-optical element plate (referred to as a modulator) described in Japanese Unexamined Patent Application, First Publication No. Hei 5-256794 is used as an inspection apparatus that inspects the operation of such liquid crystal drive substrates. This inspection apparatus is comprised of arranging opposing modulators on a liquid crystal drive substrate serving as the inspection target, and in the case of applying a prescribed data voltage to each pixel electrode of the liquid crystal drive substrate, capturing different modulator images corresponding to the status of voltage applied to the pixel electrodes (voltage image) by an image capturing means such as a CCD camera, and calculating the voltage of each pixel electrode based on the electro-optical characteristics of a modulator for which this voltage image has been preconfirmed (pixel voltage) to judge whether or not data voltage is normally applied to each pixel electrode, namely to judge the quality of the liquid crystal drive substrate corresponding to the manner in which defective pixel electrodes to which data voltage is not normally applied are distributed.

In inspection apparatuses of the prior art that used such a modulator, when pixel voltage is calculated from a voltage image, normal pixels and defective pixels are judged by converting to binary by comparing the pixel voltage with a prescribed threshold value. In this case, the threshold value of an inspection apparatus of the prior art is used to judge defective pixels by setting a single threshold value, the following problem existed.

FIG. 14 is a characteristics drawing showing the relationship between pixel voltage and threshold value for explaining this problem. In this drawing, the horizontal axis indicates pixels, namely the locations of pixels in the direction in which they are arranged, while the vertical axis indicates the pixel voltage of each pixel in the direction in which they are arranged. Here, the pixel voltage of each pixel demonstrates the pixel voltage or the pattern by which pixel voltage changes corresponding to the type of non-conformity in the case there has been some type of non-conformity in the mechanism by which data voltage is written to the pixels.

For example, examples of types of defective pixels (defect types) include (1) open line defects, (2) point defects and (3) shorted line defects. Open line defects occur as a result of a disconnection at some location in the above data lines or gate lines, and are defects in which data voltage is not normally written to a plurality of consecutive pixel electrodes. As shown in the drawing, the pixel voltage of pixel electrodes having this type of open line defect (open line defect sections) is such that a value considerably lower than the pixel voltage of normal pixels continues across a plurality of pixels.

Point defects refer to defects in which data voltage is not written normally to a single pixel electrode, and occur due to insulation defects of a certain pixel electrode or an operation defect of a TFT provided in the pixel electrode. As shown in the drawing, the pixel voltage of a pixel electrode having this type of point defect (point defect section) is a low value over the range of a single pixel relative to the pixel voltage of normal pixels, and is typically somewhat higher than the above-mentioned open line defect sections.

In addition, shorted line defects occur due to shorting of the above data lines or gate lines at any location, and are defects in which data voltage is not normally written to a plurality of consecutive pixel electrodes. As shown in the drawing, the pixel voltage of pixel electrodes having this type of shorted line defect (shorted line defect sections) is such that a value that is not extremely different from the pixel voltage of normal pixels continues across a plurality of pixels.

In this manner; the pixel voltage obtained from the voltage image of the modulator becomes various values corresponding to the type of defect, and the magnitude of that value for each type of defect is determined statistically through an inspection of the liquid crystal drive substrate. In addition, normal pixels demonstrate variation over a fixed range for pixel voltage according to various causes, and that pixel voltage may be a voltage value that approximates a shorted line defect (normal point) as shown in the drawing.

In inspection apparatuses of the prior art, defective pixels and normal pixels were judged by setting a single threshold value for this type of pixel voltage. This threshold value is determined for each actual production step of the liquid crystal drive substrates based on the extent to which an inspection standard is set and so forth. As shown in the drawing, in the case of setting, for example, a single threshold value, a normal point is judged as a defective pixel. In addition, in the case of setting two threshold values in order to avoid this, it becomes no longer possible to detect shorted line defect sections. Thus, in the case of judging defective pixels and normal pixels by setting a single threshold value as in the prior art, together with it not being possible to accurately classify each type of defect, the accuracy of the judgment of defective pixels itself becomes poor.

On the other hand, in this type of inspection apparatus, improvement of throughput is an extremely important performance element. Efforts have been made in the past to shorten the time required to inspect a single liquid crystal drive substrate, namely to improve throughput, by making contrivances in the inspection algorithm and so forth. Thus, in solving the above problem, it is necessary to pay attention to this point. Although it is possible to achieve improvement of inspection accuracy of the inspection apparatus by solving the above problem, it is necessary to simultaneously ensure that there is no decrease in throughput.

In consideration of the above problems, the objects of the present invention comprise the following:
(1) to improve inspection accuracy of liquid crystal drive substrates;
(2) to judge types of defects more accurately; and,
(3) to improve inspection accuracy of liquid crystal drive substrates without decreasing throughput.

DISCLOSURE OF THE INVENTION

In order to achieve the above objects, the present invention discloses an inspection apparatus for liquid crystal drive substrates that discriminates defective pixels having an abnormal voltage and normal pixels having a normal voltage based on pixel voltage by arranging an electro-optical element plate in opposition to a liquid crystal drive substrate on which pixel electrodes are arranged in the form of a matrix, and calculating the actual voltage of each pixel electrode in the form of a pixel voltage based on the voltage image of the electro-optical element plate obtained by writing a prescribed voltage to the pixel electrodes, and on the electro-optical characteristics of the above electro-optical element plate, wherein the inspection apparatus comprises an image processing apparatus that classifies pixel electrodes of defect candidates for each defect type by comparing the pixel voltage with a threshold value set for each defect type of pixel defect, and finally judges the pixel electrodes of defect candidates for each defect type as defective pixels of each defect type based on judgment conditions provided for each defect type.

In addition, as a second means, the present invention discloses an inspection apparatus for liquid crystal drive substrates that discriminates defective pixels having an abnormal voltage and normal pixels having a normal voltage based on pixel voltage by arranging an electro-optical element plate of a size smaller than a liquid crystal drive substrate in opposition to the liquid crystal drive substrate on which pixel electrodes are arranged in the form of a matrix, acquiring a voltage image of the electro-optical element plates extending over the entire region of the liquid crystal drive substrate by sequentially moving the relative position for each small section so that each small section of the liquid crystal drive substrate is in planar opposition with the electro-optical element plate in the state in which a prescribed voltage is written to the pixel electrodes, and calculating the actual voltage of each pixel electrode in the form of a pixel voltage based on the voltage image and the electro-optical characteristics of the above electro-optical element plate, the inspection apparatus comprises an image processing apparatus that classifies pixel electrodes of defect candidates for each defect type by comparing pixel voltage with a threshold value set for each defect type of defective pixel, and finally judges pixel electrodes of defect candidates for each the defect type as defective pixels of each defect type based on judgment conditions provided for each defect type, while also performing the above classification processing during movement between each of the above small sections.

As a third means, the present invention discloses an inspection apparatus for liquid crystal drive substrates that discriminates defective pixels having an abnormal voltage and normal pixels having a normal voltage based on pixel voltage by arranging an electro-optical element plate in opposition to a glass substrate on which a plurality of liquid crystal drive substrates are formed on which pixel electrodes are arranged in the form of a matrix, acquiring a voltage image of the electro-optical element plate for all liquid crystal drive substrates by sequentially moving the relative position for each liquid crystal drive substrate so that each liquid crystal drive substrate is in planar opposition with the electro-optical element plate in the state in which a prescribed voltage is written to each pixel electrode, and calculating the actual voltage of each pixel electrode in the form of a pixel voltage based on the voltage image and the electro-optical characteristics of the above electro-optical element plate, the inspection apparatus comprises an image processing apparatus that classifies the pixel electrodes of defect candidates for each above defect type by comparing pixel voltage with a threshold value set for each defect type of defective pixel, and finally judges the pixel electrodes of defect candidates for each defect type as defective pixels of each defect type based on judgment conditions provided for each defect type, while also performing the judgment during movement between each liquid crystal drive substrate.

As a fourth means, the present invention discloses an inspection apparatus for liquid crystal drive substrates that discriminates defective pixels having an abnormal voltage and normal pixels having a normal voltage based on pixel voltage by arranging an electro-optical element plate of a size smaller than liquid crystal drive substrates in opposition to a glass substrate on which a plurality of the liquid crystal drive substrates are formed on which pixel electrodes are arranged in the form of a matrix, acquiring a voltage image of the electro-optical element plate for all liquid crystal drive substrates over the entire region of all liquid crystal drive substrates by sequentially moving the relative position for each liquid crystal drive substrate so that each liquid crystal drive substrate is in planar opposition with the electro-optical element plate, and by moving the relative position for each small section so that each small section of the liquid crystal drive substrates is in planar opposition with the electro-optical element plate, in the state in which a prescribed voltage is written to the pixel electrodes, and calculating the actual voltage of each pixel electrode in the form of a pixel voltage based on the voltage image and the electro-optical characteristics of the above electro-optical element plate, the inspection apparatus comprises an image processing apparatus that classifies the pixel electrodes of defect candidates for each defect type by comparing pixel voltage with a threshold value set for each defect type of defective pixel, and finally judges the pixel electrodes of defect candidates for each defect type as defective pixels of each defect type based on judgment conditions provided for each defect type, while also processing the classification during movement for each of the above small sections, and processing the judgment during movement between each liquid crystal drive substrate.

As a fifth means, in any of the above first to fourth means wherein the image processing apparatus, the pixel voltage is sequentially compared starting with a threshold value set for each defective pixel defect type that is farther removed from the pixel voltage of normal pixels, and comparison with the next threshold value is omitted at the point it is judged to be a defect candidate in comparison with a certain threshold value.

BRIEF DESCRIPTION OF THE DRAWINGS

FIG. 8 is a table showing an example of the classification processing results of defect type in site processing in one embodiment of the present invention:

FIG. 9 is a table showing the status of registration of classification results of defect type in site processing to a inspection information database in one embodiment of the present invention.

FIG. 11 is a schematic drawing showing an example of extraction results of defective pixels in panel processing in the form of a two-dimensional arrangement in one example of the present invention.

FIG. 13 is a schematic drawing showing an example of defective pixels judged to be line defects and cluster defects in one embodiment of the present invention.

BEST MODE FOR CARRYING OUT THE INVENTION

The following provides an explanation of one embodiment of the inspection apparatus for liquid crystal drive substrates of the present invention with reference to the drawings.

Figure 1:
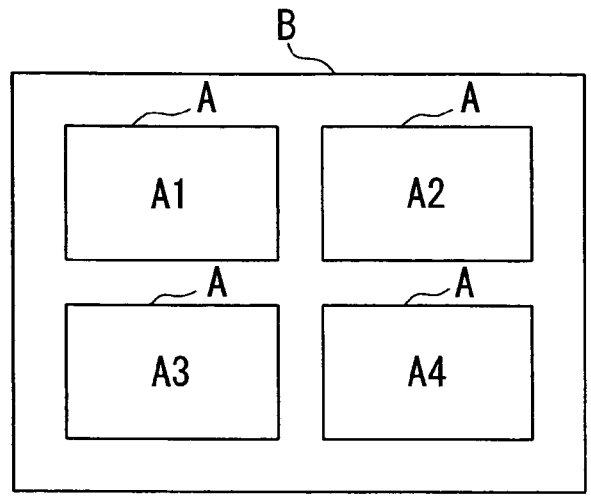
FIG. 1 is an overhead view showing the appearance of a liquid crystal drive substrate that is the target of inspection in one embodiment of the present invention.

To begin with, as shown in FIG. 1, liquid crystal drive substrates A, which are the target of inspection in the present embodiment, are formed in plurality on a single glass substrate B (for example, 4 substrates consisting of A1 through A4), and are individually separated in a later step. In the case of inspecting these liquid crystal drive substrates before being separated, glass substrate B is placed on a movement means such as an X-Y table, and each liquid crystal drive substrate A is positioned in opposition to a modulator by operating the movement means as will be explained below.

Figure 2:
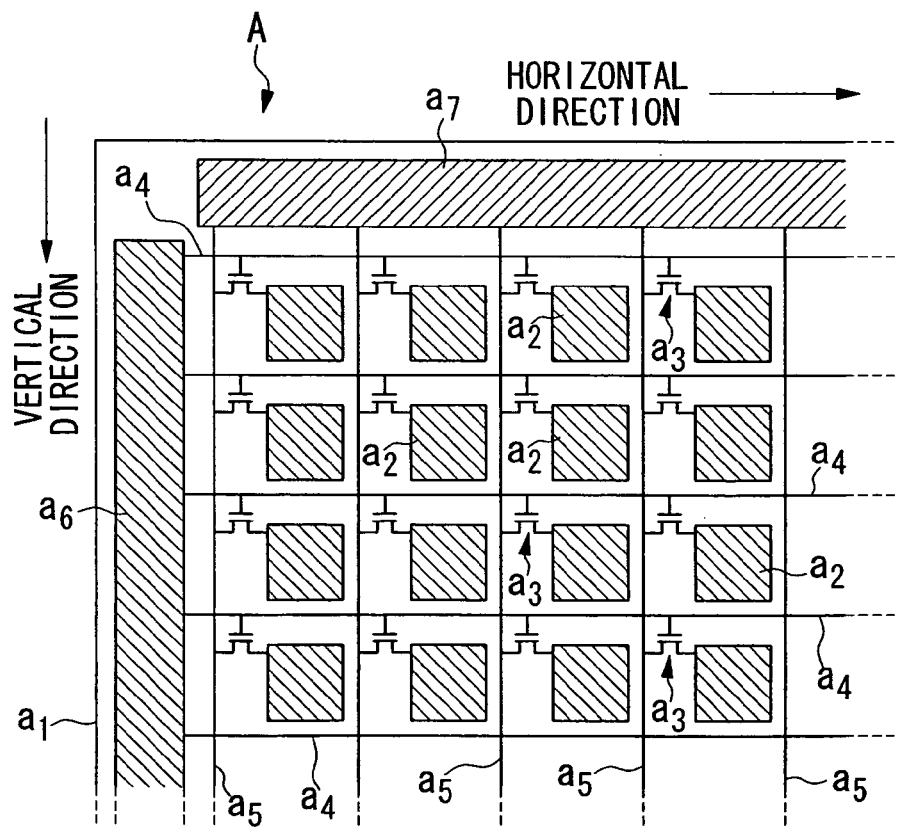
FIG. 2 is an overhead view showing the constitution of a liquid crystal drive substrate that is the target of inspection in one embodiment of the present invention.

FIG. 2 is an overhead view showing an example of the constitution of such a liquid crystal drive substrate A. This liquid crystal drive substrate A is of the active matrix type that uses thin film transistors (TFT). In this drawing, a large number of pixel electrodes a2 and TFT a3 are formed in the form of a matrix at fixed intervals on the surface of glass substrate a1. Namely, pixel electrodes a2 and TFT a3 are arranged in the form of a matrix at fixed intervals in the horizontal direction and vertical direction of an image displayed by the liquid crystal drive substrate A.

Together with a plurality of mutually parallel gate lines a4 being lined between these pixel electrodes a2 and TFT a3, data lines a5 are lined so as to be perpendicular to these gate lines a4. For each TFT a3, a source terminal is connected a data line a5, a drain terminal is connected to a pixel electrode a2, and a gate terminal is connected to a gate line a4. Each TFT a3 is powered by applying a prescribed voltage to each gate terminal from a gate line a4, and at this time, a data voltage applied to a source terminal via each data line a5 is supplied to each pixel electrode a2.

In addition, in order to protect each TFT a3 from static electricity and so forth in liquid crystal drive substrate A, gate lines a4 are respectively connected to a short bar a6, and data lines a5 are respectively connected to a short bar a7. Furthermore, each gate line a4 and data line a5 is separated from each short bar a6 and a7 and connected to the drive circuit of a liquid crystal panel in a later step.

Figure 3:
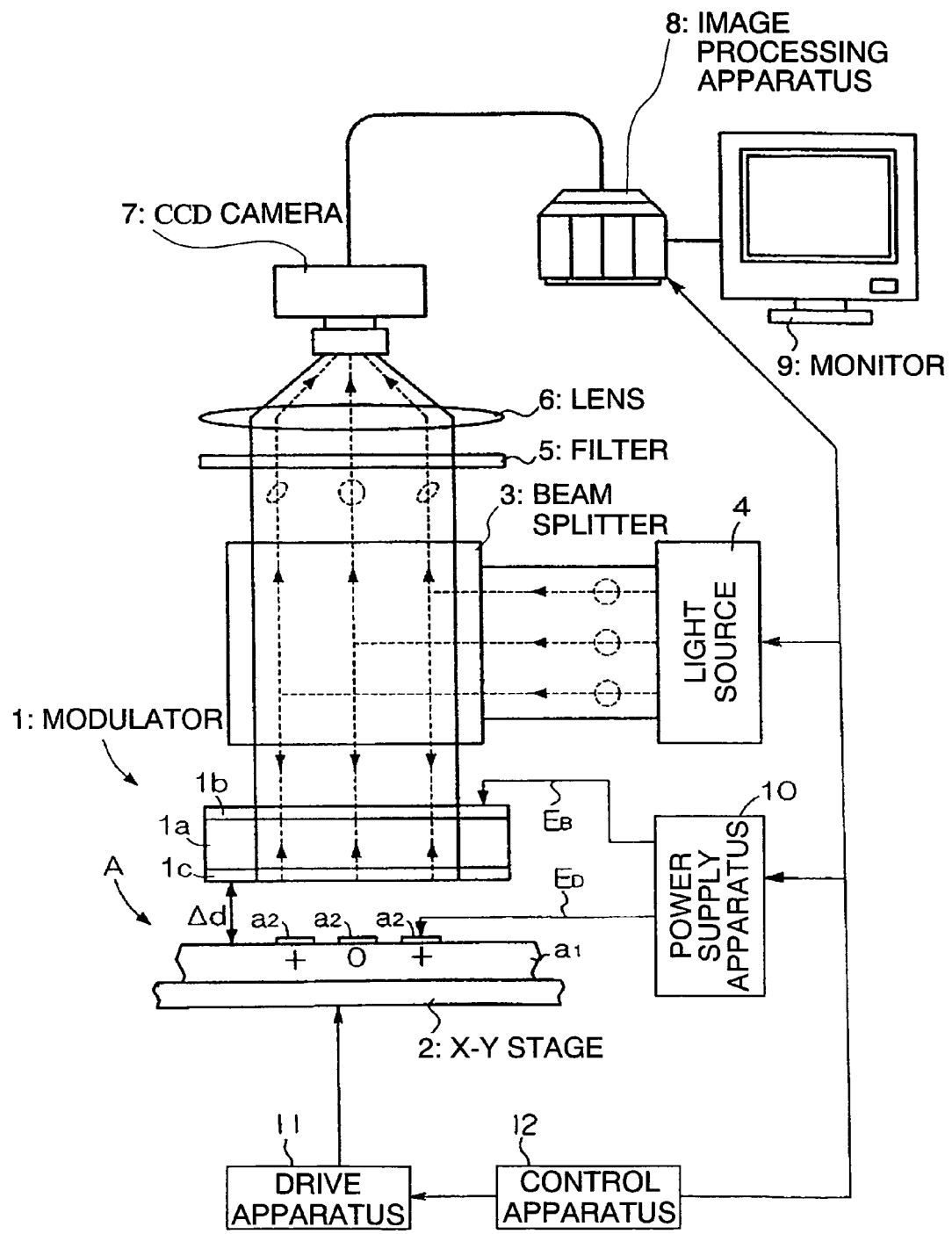
FIG. 3 is a block drawing showing the functional composition of an inspection apparatus for liquid crystal drive substrates in one embodiment of the present invention.

FIG. 3 is a block drawing of an inspection apparatus in the present embodiment. In this drawing, reference symbol 1 indicates an electro-optical element plate (modulator) that is composed of a liquid crystal sheet 1a, inside which liquid crystal is sealed, a thin film transparent electrode 1b and a dielectric reflective film 1c. This modulator 1 is composed by laminating thin film transparent electrode 1b onto one side of liquid crystal sheet 1a having a square shape (e.g., 40 mm×40 mm), and vapor depositing or laminating dielectric reflective film 1c on the other side.

This modulator 1 is fixed in an inspection apparatus main unit not shown such that its surface is level and dielectric reflective film 1c is facing downward, and the above liquid crystal drive substrate A is positioned in opposition below it separated by a minute gap Δd (ten μm to several tens of μm). In the case of the present embodiment, the size of the above liquid crystal drive substrate A is larger than the size of the above modulator 1.

Reference symbol 2 indicates an X-Y stage that is moved two-dimensionally in the X-Y plane, namely the horizontal plane, by drive apparatus 11. Glass substrate B is placed on this X-Y stage 2 by means of a Z stage not shown so as to move the glass substrate B in the horizontal plane. Furthermore, the Z stage is provided for adjusting the distance between glass substrate B, or in other words liquid crystal drive substrate A, and modulator 1.

In the case of the present embodiment, since the size of liquid crystal drive substrate A is larger than the size of modulator 1 as previously mentioned, all of the pixel electrodes a2 on liquid crystal drive substrate A cannot be made to oppose modulator 1. Therefore, liquid crystal drive substrate A is divided into small sections (sites) equivalent to the size of modulator 1, and X-Y stage 2 is sequentially moved so that the sites are sequentially opposed to modulator 1.

Reference symbol 3 indicates a beam splitter and reference symbol 4 indicates a light source. Beam splitter 3 is equipped in an opposed state above modulator 1, and illuminates the entire surface of modulator 1 by reflecting light illuminated from light source 4 provided to its side. In addition, this beam splitter 3 also has the action of allowing reflected light to pass upward from modulator 1. Here, a light source that radiates light of high luminance, such as light-emitting diode (LED), is applied for light source 4, and the emission of that light is controlled in a strobe state by a control apparatus not shown.

Reference symbol 5 indicates a filter (optical filter) that is provided above the above beam splitter 3 and which only allows light reflected from modulator 1 that has passed through the beam splitter 3 of a specific wavelength range to pass through lens 6. Lens 6 is a convex lens that gathers the light that has passed through filter 5 and directs it to a CCD camera 7.

CCD camera 7 captures an image of the surface of the above modulator 1 based on light that has entered from lens 6. This CCD camera 7 has performance of, for example, a frame frequency during photography of 30 Hz (cycle: 33.3 ms), spatial resolution of 2.8 CCD/100 µm, and pixel number of 1024 k, and outputs the voltage image of modulator 1 to image processing apparatus 8 in the form of a digital video signal. Furthermore, the pitch of pixel electrodes a2 of the above liquid crystal drive substrate A is, for example, about 100 µm, and the resolution of the above CCD camera 7 has adequate performance for this pitch of pixel electrodes a2.

Image processing apparatus 8 detects defective portions of liquid crystal drive substrate A from the above voltage image by performing a prescribed image processing on the digital video signal input from CCD camera 7 (pixel electrodes a2 to which data voltage is not normally written, or for which the written data voltage is not normally held), and outputs those results to monitor 9. For example, image processing apparatus 8 displays defective pixels and normal pixels on monitor 9 by color coding, or outputs a video signal for numerically displaying the number of defective portions to a monitor. Furthermore, the following provides a detailed description of this processing in image processing apparatus 8.

Reference symbol 10 indicates a power supply apparatus, which together with applying bias voltage $E_B$ to thin film transparent electrode 1b of modulator 1, is also for applying data voltage $E_D$ to liquid crystal drive substrate A. Bias voltage $E_B$ is in the form of a bipolar square wave of ±230 V p-p at one-half the frame frequency of 30 Hz of the above CCD camera 7 (cycle: 33.3 ms), namely 15 Hz (cycle: 66.6 ms).

On the other hand, data voltage $E_D$ is applied to the source terminal of the above TFT, and is applied to pixel electrodes a2 when the TFT is powered. This data voltage $E_D$ changes to a square wave that is only ±Δe from a prescribed voltage E in synchronization with the above bias voltage $E_B$. Furthermore, although not shown in the drawings, a gate voltage that controls the powered and interrupted status of the TFT is also supplied to liquid crystal drive substrate A from power supply apparatus 10.

This power supply apparatus 10, the above light source 4, drive apparatus 11 and image processing apparatus 8 are respectively controlled by control apparatus 12. Control apparatus 12 controls each of the above apparatuses based on a control program and operation information input from an operating means (such as a keyboard) not shown.

Next, a detailed explanation is provided of the operation of the inspection apparatus for liquid crystal drive substrates composed in this manner. Furthermore, the following explanation is given for the case of the number of the above sites (site number) being 9.

Figure 4:
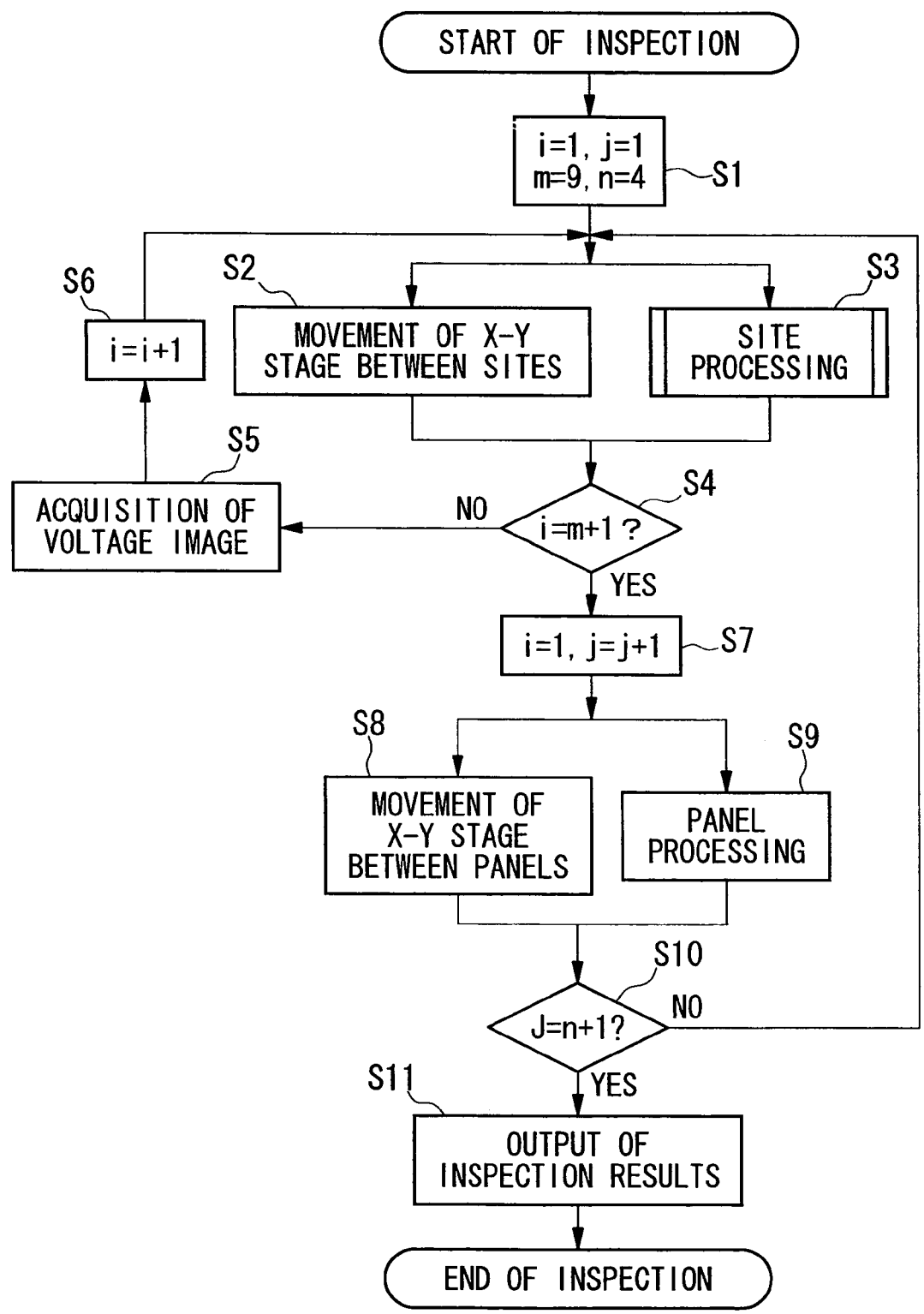
FIG. 4 is a flow chart showing the overall inspection sequence for liquid crystal drive substrates in one embodiment of the present invention.

Initially, an explanation is provided of overall inspection processing that is executed by control apparatus 12 while following the flow chart of FIG. 4. Inspection of four liquid crystal drive substrates (namely, A1 through A4) formed on a single glass substrate B is completed by this inspection processing.

To begin with, when glass substrate B is placed on X-Y stage 2 and the starting of inspection is instructed from an operating means, control variables i and j, and control constants m and n, are initially set (Step S1). In the case of the present embodiment, since four liquid crystal drive substrates A1 through A4 are formed on glass substrate B, the number of panels is "4", and since inspection is carried out by dividing a single liquid crystal drive substrate A into 9 sites, the number of sites is "9".

Thus, in this initial setting processing, control variable i that indicates the site number during inspection is set to 1, control variable j that indicates the panel number during inspection is set to 1, control constant m that indicates the number of sites is set to 9, and control constant n that indicates the number of panels is set to 4. As a result, liquid crystal drive substrate A for which the panel number is "1" (for example, liquid crystal drive substrate A1) is set as the target of inspection, and the site of liquid crystal drive substrate A1 for which the site number is "1" is set as the target for acquisition of voltage image.

Here, the positional relationship between panel number and the liquid crystal drive substrates A on glass panel B, as well as the positional relationship between the site number of each site and its positional relationship on liquid crystal drive substrate A is pre-stored in memory in control apparatus 12 in the form of inspection basic data. Namely, when the above panel number and site number are instructed, control apparatus 12 controls drive apparatus 11 based on this inspection basic data, and moves X-Y stage 2 so that the portion corresponding to site number "1" of liquid crystal drive substrate A1 moves to a position in opposition to modulator 1 (Step S2).

Furthermore, since this state is the initial stage of the start of inspection, and voltage images are not acquired from any of the sites, control apparatus 12 continues to execute voltage image acquisition processing without executing the site processing of Step S3 (Step S4).

Namely, control apparatus 12 judges whether or not control variable i is equal to (m+1), namely 10. Since operation is currently at the start of inspection and "i=1" is set in the above Step S1, the judgment here becomes "No", and voltage image acquisition processing is executed in Step S5.

In this voltage image acquisition processing, control apparatus 12 applies bias voltage $E_B$ to modulator 1 by operating power supply apparatus 10, and in the state in which a prescribed data voltage $E_D$ is written to each pixel electrode a2 of liquid crystal drive substrate A1, causes power supply 4 to emit strobe light and causes CCD camera 7 to capture the voltage image of modulator 1 for the portion of liquid crystal drive substrate A1 corresponding to site number "1" over a plurality of frames.

The voltage images of these plurality of frames are transmitted from CCD camera 7 to image processing apparatus 8 in the form of a digital video signal. Image processing apparatus 8 the voltage images of these plurality of frames, generates an inspected image that is provided for calculation of pixel voltage, and stores the inspected image for each pixel of CCD camera 7.

When voltage images are acquired by image processing apparatus 8 in this manner, the processing of the above step S2 is repeated after incrementing control variable i (Step S6). Namely, as a result of control variable i being incremented and set to "2", control apparatus 12 moves X-Y stage 2 by controlling drive apparatus 11 so that the site corresponding to site number "2" of liquid crystal drive substrate A1 is positioned in opposition to modulator 1.

During the time this liquid crystal drive substrate A1 moves from the portion corresponding to site number "1" to the portion corresponding to site number "2", site processing of the portion corresponding to site number "1" acquired in the above step S5 is executed by image processing apparatus 8 (Step S3). This site processing consists of processing in which defective pixels of each type are extracted from the above inspected image, a detailed description of which is provided later.

When site processing of the portion corresponding to site number "1", and movement of liquid crystal drive substrate A1 to the portion corresponding to site number "2", is completed, a judgment is made as to whether control variable i is equal to "10" (Step S4), the voltage image of the portion corresponding to site number "2" is acquired (Step S5), control variable i is incremented in Step S6 and the processing of Step S2 is repeated.

Namely, as a result of the loop processing of Steps S2 through S6 being repeated, voltage images of the portions corresponding to site number "1" to site number "9" of liquid crystal drive substrate A1 are acquired (Step S5), and site processing is executed for these portions corresponding to site number "1" to site number "9". Then in Step S6, when control variable i is set to "10" and site processing of the portion corresponding to site number "9" is completed (Step S3), the judgment of Step S4 becomes "Yes", and acquisition processing of the voltage images of all sites of liquid crystal drive substrate A1 along with site processing are completed.

In this manner, when site processing of all sites pertaining to liquid crystal drive substrate A1 is completed, together with control variable i being set to the initial value of "1", control variable j is incremented and set to "2" (Step S7). As a result, control apparatus 12 puts glass substrate B in a state in which it is moved a certain distance away from modulator 1 by driving a Z stage, and moves liquid crystal drive substrate A2 to a position in opposition to modulator 1 by moving X-Y stage 2 based on the above inspection basic data (Step S8).

Panel processing is then executed during the time of this movement from liquid crystal drive substrate A1 to liquid crystal drive substrate A2 (Step S9). When this panel processing is completed, whether or not control variable j is (n+1), namely 5, is judged in Step S10. Here, since (j=2) is set in the above Step S7, the judgment becomes "No", and the loop processing of the above Steps S2 through S6 is repeated for liquid crystal drive substrate A2 as well. Furthermore, this panel processing is processing in which defective pixels of liquid crystal drive substrate A1 are judged for each defect type based on the results of site processing, the details of which are described later.

Namely, as a result of control apparatus 12 repeating the loop processing according to Steps S2 through S10 until the judgment of Step S10 becomes "Yes", namely until panel processing has been completed for all liquid crystal drive substrates A1 through A4 on glass substrate B in the order of A1, A2, A3 and A4 (Step S9), when defect judgment for all liquid crystal drive substrates A1 through A4 is completed, those results are output to monitor 9 in the form of the inspection results of the glass substrate B (Step S11).

For example, the number and distribution of defective pixels are displayed for each defect type on monitor 9 in the form of inspection results. The operator that monitors the inspection then certifies the glass substrate B as being defective or acceptable based on the inspection results displayed on this monitor 9.

Figure 5:
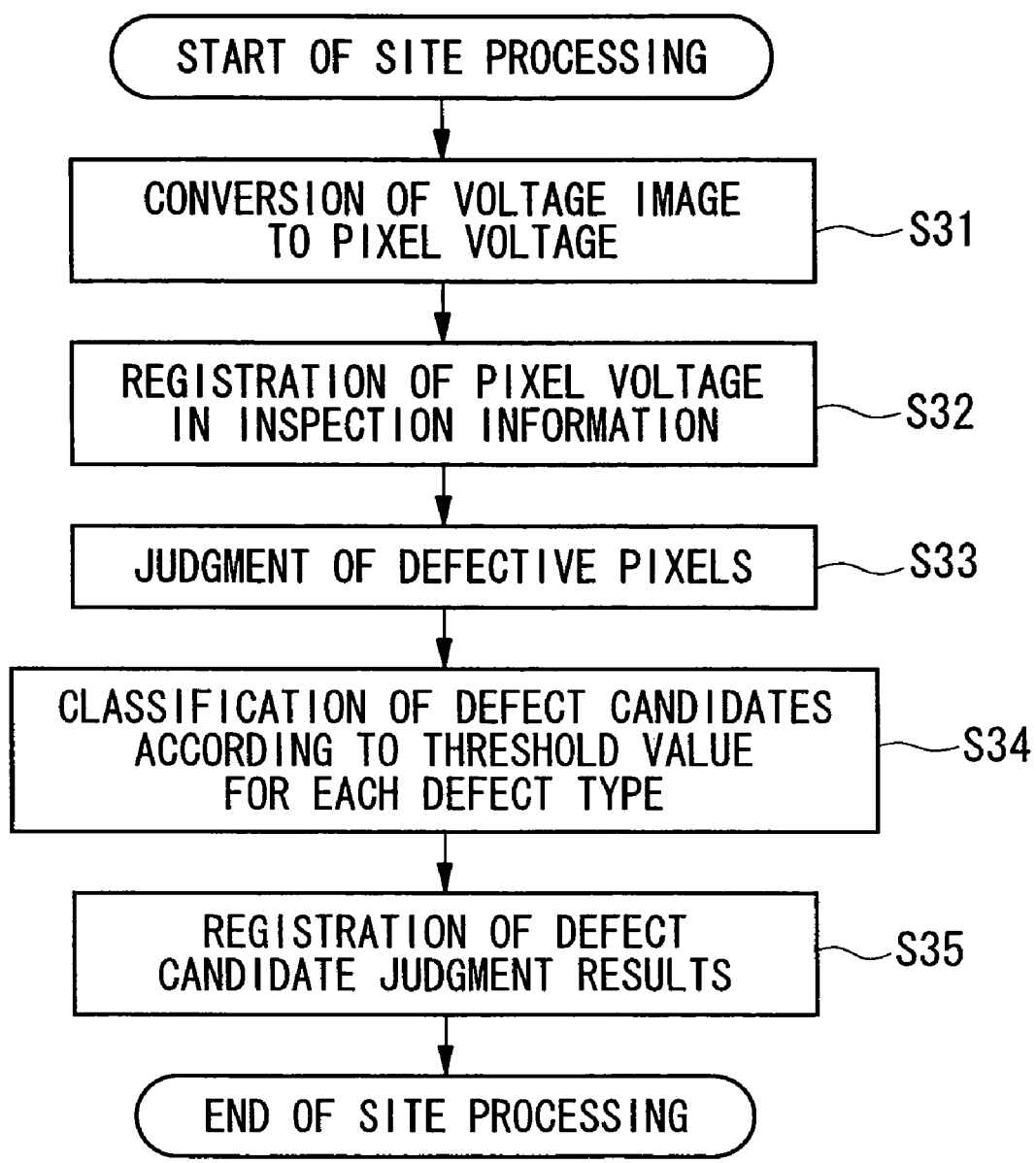
FIG. 5 is a flow chart showing the details of site processing in the overall inspection sequence for liquid crystal drive substrates in one embodiment of the present invention.

Next, an explanation is provided of the details of the above site processing (Step S3) while following the flow chart shown in FIG. 5. Furthermore, this site processing is executed by image processing apparatus 8.

In this site processing, the voltage image of each site captured by CCD camera 7 is converted to the pixel voltage of each pixel electrode a2 of liquid crystal drive substrate A (Step S31). More specifically, the voltage image of a plurality of frames captured for every site is added by acquisition processing of the above voltage image (Step S5) to obtain a detected image, and image data that indicates the brightness of the detected image is stored in image processing apparatus 8 for each CCD pixel of CCD camera 7. By performing a prescribed arithmetic processing on the image data of this detected image, the pixel voltage of each pixel electrode a2 is calculated in the manner described below.

Figure 6:
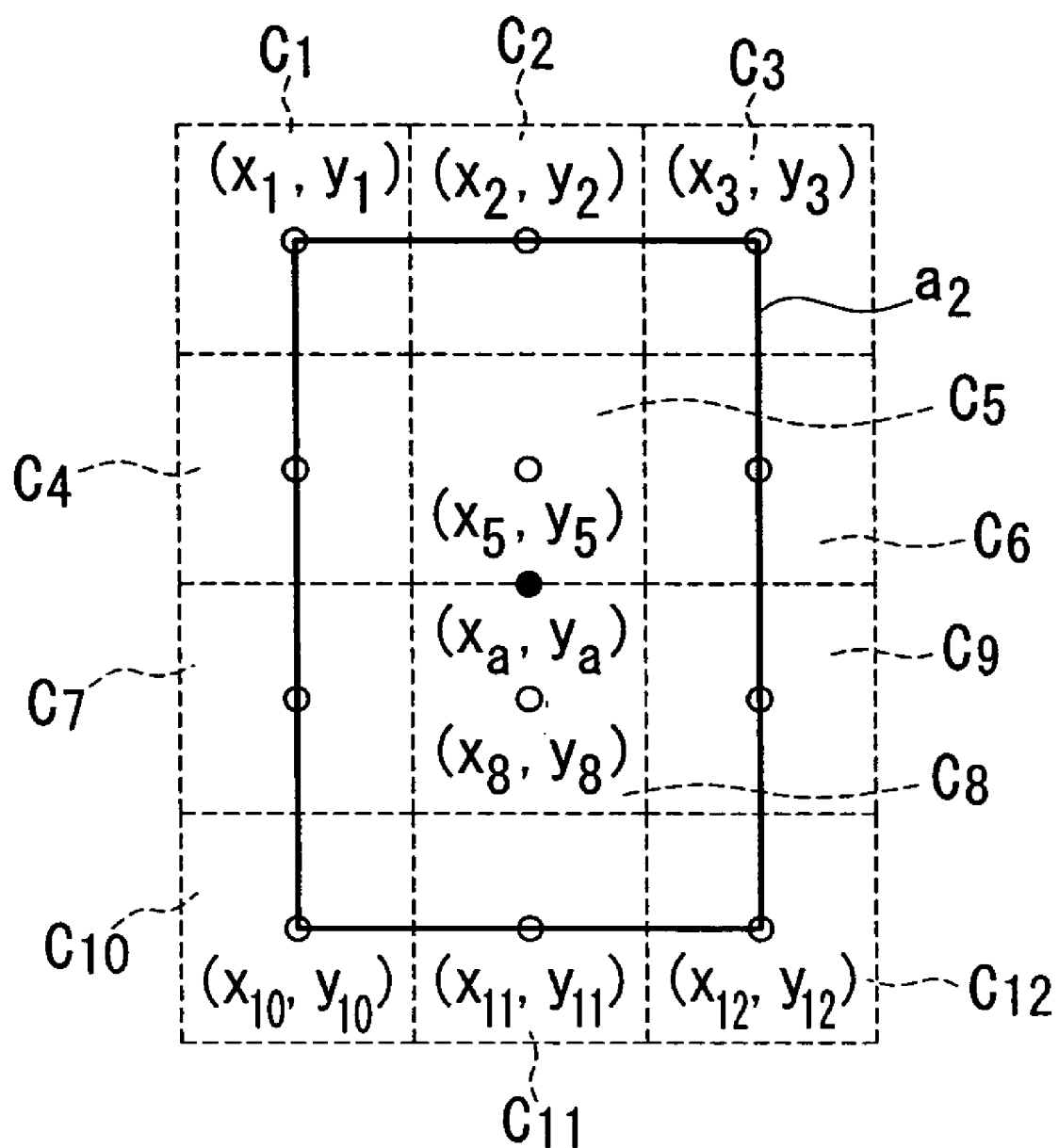
FIG. 6 is a schematic drawing for explaining the calculation method of pixel voltage of pixel electrodes in site processing in one embodiment of the present invention.

Namely, since the size of pixel electrodes a2 is larger than the size of the CCD pixels of CCD camera 7, a single pixel electrode a2 opposes a plurality of CCD pixels. For example, in the case of FIG. 6, CCD pixels C5 and C8 completely oppose pixel electrode a2, while CCD pixels C1 through C4, C6, C7 and C9 through C12 partially oppose pixel electrode a2. In this state, the two-dimensional weighted average is calculated in the manner of equation (1) below based on the central coordinates of pixel electrode a2 (xa,ya), the central coordinates of each CCD pixel C1 through C12 (x1,y1), (x2,y2) . . . (x12,y12), and image data v1 through v12 of each CCD pixel C1 through C12, and the value of this weighted average V (xa,ya) is taken to be the pixel voltage of pixel electrode a2 having central coordinates (xa,ya).

$$V(xa,ya)=(k1.v1+k2.v2+k3.v3+k4.v4+k5.v5+k6.v6+k7.v7+k8.v8+k9.v9+k10.v10+k11.v11+k12.v12)/12 \quad (1)$$

wherein, the above k1 through k12 are coefficients that adopt a value that is proportional to opposing area (1.0 in the case of complete opposition), and in this case, k1=0.25, k2=0.5, k3=0.25, k4=0.5, k5=1.0, k6=0.5, k7=0.5, k8=1.0, k9=0.5, k10=0.25, k11=0.5 and k12=0.25.

The processing that calculates the pixel voltage of pixel electrode a2 in this manner is executed rapidly using hardware by an image processing circuit provided within image processing apparatus 8, and is calculated for all pixel electrodes a2 contained at each site. The size of the CCD pixels, the size of pixel electrode a2, the central coordinates of pixel electrode a2, the central coordinates of each CCD pixels and so forth are preliminary stored in image processing apparatus 8 in the form of basic data, and by inputting this basic data and image data of each CCD pixel to the image processing circuit, the pixel voltage of each pixel electrode a2 is sequentially calculated.

When the pixel voltage of each pixel electrode a2 of a single site is calculated in this manner, each the pixel voltage is registered as inspection information for the relevant region of the inspection information database provided for each liquid crystal drive substrate A (Step S32). In this registration processing of pixel voltage, the pixel voltage of each pixel electrode a2 is registered in the inspection information database in the form of voltage data having accuracy of 2 bytes. Image processing apparatus 8 then performs the following processing for each site based on the inspection information registered in this inspection information database.

Here, in the following processing, pixel electrodes a2 that are potential defect candidates are judged for each defect type. In the present embodiment, these defect types consisted of those indicated below.

(1) Point Defect (Cluster Defect)

In this type of defect, the pixel voltage of a single pixel electrode a2 has an abnormal value. Furthermore, defects in which a small number of point defects are gathered consecutively are referred to as cluster defects.

(2) Gate Open Line Defect

This type of defect is caused by a gate line a4 being disconnected by some cause, and the pixel voltages of a plurality of consecutive pixel electrodes a2 consecutively exhibit abnormal values. In the case of liquid crystal drive substrate A shown in the above FIG. 2, since gate lines a4 are lined in the horizontal direction, namely the direction of the rows in which pixel electrodes a2 are arranged, the pixel voltages of consecutive pixel electrodes a2 in the direction of those rows are abnormal.

(3) Gate Shorted Line Defect

This type of defect is caused by a gate line a4 having been shorted by some cause, and the pixel voltages of a plurality of consecutive pixel electrodes a2 consecutively exhibit abnormal values. In the case of liquid crystal drive substrate A shown in the above FIG. 2, similar to the case of the above gate open line defect, the pixel voltages of consecutive pixel electrodes a2 in the direction of the rows are abnormal.

(4) Date Open Line Defect

This type of defect is caused by data line a5 being disconnected by some cause, and the pixel voltages of a plurality of consecutive pixel electrodes a2 consecutively exhibit abnormal values. In the case of liquid crystal drive substrate A shown in the above FIG. 2, since data lines a5 are lined in the vertical direction, namely the direction of the columns in which pixel electrodes a2 are arranged, the pixel voltages of consecutive pixel electrodes a2 in the direction of those columns are abnormal.

(5) Date Shorted Line Defect

This type of defect is caused by a data line a5 having been shorted by some cause, and the pixel voltages of a plurality of consecutive pixel electrodes a2 consecutively exhibit abnormal values. In the case of liquid crystal drive substrate A shown in the above FIG. 2, similar to the case of the above data open line defect, the pixel voltages of consecutive pixel electrodes a2 in the direction of the columns are abnormal.

(6) Mura Defect

This type of defect refers to defects in which the pixel voltages of a plurality of pixel electrodes a2 exhibit locally abnormal values within a comparatively narrow range, and there are many cases in which the resulting pixel voltages do not differ greatly from the pixel voltages of normal pixels.

Figure 7:
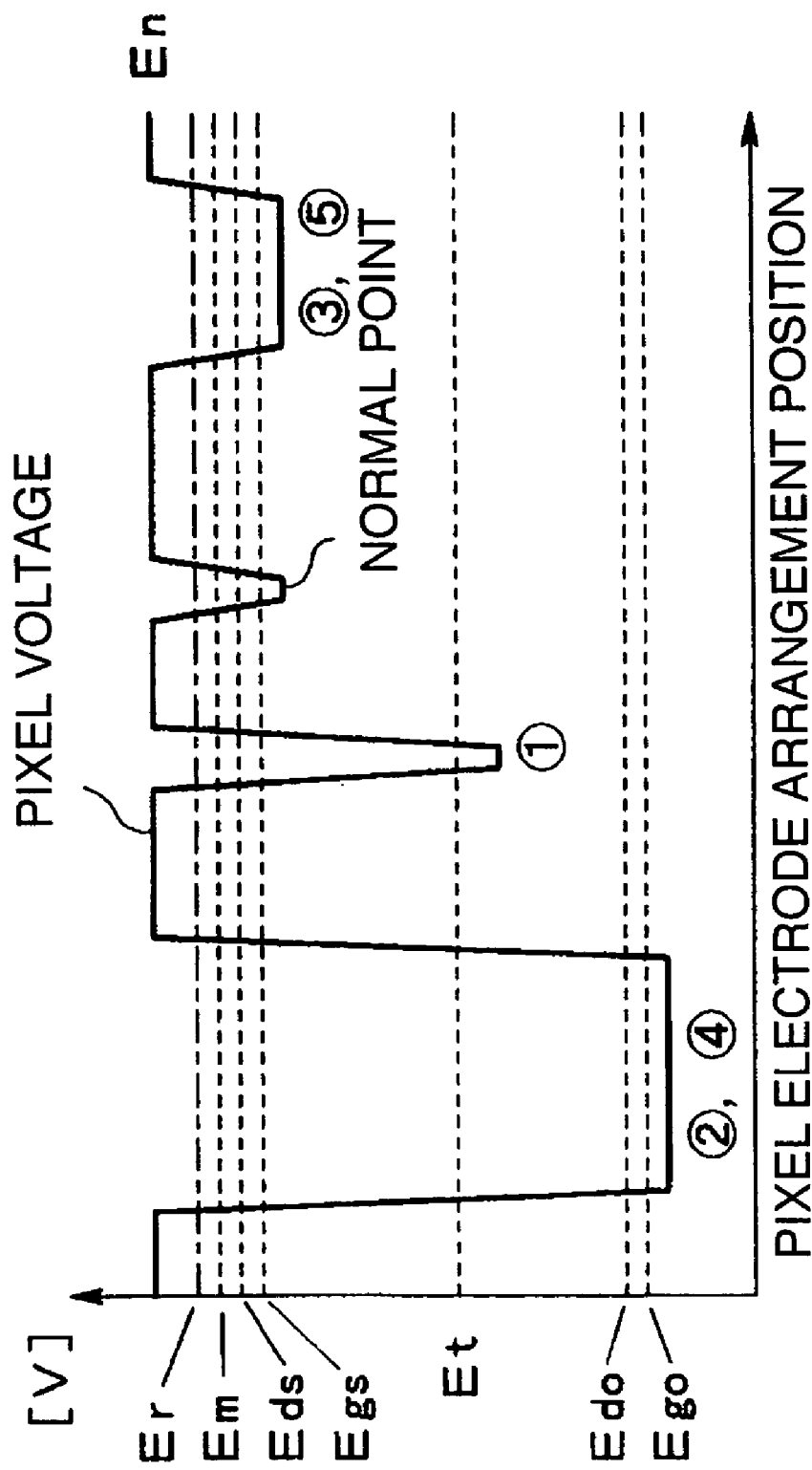
FIG. 7 is an explanatory drawing showing thee pixel voltage for each defect type and the defect candidate threshold value for each defect type in one embodiment of the present invention.

FIG. 7 shows the pixel voltages of defective pixels for each such type of defect. As shown in this drawing, the pixel voltages of gate open line defect (2) and data open line defect (4) demonstrate values that have comparatively large phase differences with respect to pixel voltage En of normal pixels. The pixel voltages of gate shorted line defect (3) and data shorted line defect (5) demonstrate values are comparatively close to pixel voltage En of normal pixels.

The pixel voltage of point defect (cluster defect) (1) demonstrates a value that is intermediate to the pixel voltage of gate open line defect (2) and gate shorted line defect (3). In addition, although not shown in the drawing, the pixel voltage of mura defect (6) is typically a value that is closest to pixel voltage En of normal pixels, while there are also exceptional cases in which it has a value that is close to the pixel voltage of point defect (cluster defect) (1).

A threshold value for judging a defect candidate for each defect type based on these characteristics of the pixel voltage for each defect type is stored in image processing apparatus 8. Image processing apparatus 8 judges defect candidates for each defect type in the manner described below by comparing this threshold value with the pixel voltage of each pixel electrode a2.

This threshold value is set, for example, as shown in FIG. 7 based on the characteristics of the pixel voltage for each of the above defect types. Namely, threshold value Em for judging a pixel electrode a2 corresponding to a mura defect candidate is set to a value (large value) that is closest to pixel voltage En of normal pixels, and threshold value Eds for data shorted line defect candidates, threshold value Egs for gate shorted line defect candidates, threshold value Et for point defect candidates, threshold value Edo for data open line defect candidates, and threshold value Ego for gate open line defect candidates are set thereafter in decreasing order.

Based on this background, image processing apparatus 8 performs image processing of defect candidates by first comparing the pixel voltage of each pixel electrode a2 with reference threshold value Er (Step S33). Although to which defect type the defect candidate corresponds cannot be determined, this processing is for deducing pixel electrodes a2 that may be recognized as defect candidates. This reference threshold value Er is set to a voltage value that is equal to voltage Em that is closer to pixel voltage En of normal pixels than any of the above defect candidate threshold values for judging defect candidates, or that is the closest to pixel voltage En. Image processing apparatus 8 then registers the results of the defect candidate judgment processing, namely defect candidate data, in the corresponding region of the above inspection information database.

Continuing, in Step S34, the pixel electrodes a2 that may be recognized as defect candidates are classified into the defect types. Image processing apparatus 8 judges the defect type by sequentially comparing the pixel voltage for each pixel electrode a2 with each of the above defect candidate threshold values Em, Eds, Egs, Et, Edo and Ego. At this time, image processing apparatus 8 judges defect type by comparing the pixel voltages in order starting from the threshold value of the lowest value, namely from the value that is farthest away from normal voltage En of normal pixels.

Namely, image processing apparatus 8 designates all pixel electrodes a2 that compose a single site in a prescribed order, and by first comparing the pixel voltages of the designated pixel electrodes a2 with threshold value Ego for gate open line defect candidates, judges whether or not the pixel electrodes a2 are pixel electrodes a2 corresponding to a gate open line defect candidate.

Continuing, by comparing threshold value Edo for data open line defect candidates that is the next farthest away from pixel voltage En of normal pixels after threshold value Ego with the pixel voltages of the pixel electrodes a2, image processing apparatus 8 judges whether or not the pixel electrodes a2 are pixel electrodes a2 corresponding to a data open line defect candidate, and then judges whether or not the pixel electrodes a2 are pixel electrodes a2 corresponding to a point defect candidate by comparing with threshold value Et for point defect candidates that is the next farthest away from pixel voltage En of normal pixels after threshold value Edo.

In addition, image processing apparatus 8 then judges whether or not the pixel electrodes a2 are pixel electrodes a2 corresponding to a gate shorted line defect candidate by comparing threshold value Egs for gate shorted line defect candidates that is the next farthest away from pixel voltage En of normal pixels after the above threshold value Et with the pixel voltages of the pixel electrodes a2, and then judges whether or not the pixel electrodes a2 are pixel electrodes a2 corresponding to a data shorted line defect candidate by comparing threshold value Eds for data shorted line defect candidates that is the next farthest away from pixel voltage En of normal pixels after the above threshold value Egs with the pixel voltages of the pixel electrodes a2.

Finally, image processing apparatus 8 judges whether or not the pixel electrodes a2 corresponding to a mura defect candidate by comparing threshold value Em for point defect candidates that is the next farthest away from pixel voltage En of normal pixels after the above threshold value Eds with the pixel voltages of the pixel electrodes a2. Image processing apparatus 8 thus sequentially performs this comparison processing with each defect candidate threshold value Em, Eds, Egs, Et, Edo and Ego for all pixel electrodes a2 that compose a single site to complete defect type classification processing of defect candidates of the site.

FIG. 8 is a table showing an example of the above series of processing results of classification processing of defect types of defect candidates. In this table, as shown in the bottom row, in the case pixel voltage V (xa,ya) is smaller than threshold value Ego for gate open line defect candidates, pixel electrode a2 of the pixel voltage V (xa,ya) is determined to be a defect candidate for all point defects, gate shorted line defects, gate open line defects, data shorted line defects, data open line defects and mura defects (namely, indicated with an X).

Next, in the second row from the bottom, in the case the pixel voltage is larger than threshold value Ego for gate open line defect candidates, and smaller than threshold value Edo for data open line defect candidates, pixel electrode a2 of the pixel voltage V (xa,ya) is determined to not to be a defect candidate of a gate open line defect (namely, indicated with an O), and is determined to be a defect candidate of a point defect, gate shorted line defect, data shorted line defect, gate open line defect or mura defect (namely, indicated with an X).

In the third row from the bottom, in the case the pixel voltage is larger than threshold value Edo for data open line defect candidates and smaller than threshold value Et for point defect candidates, the pixel electrode a2 of the pixel voltage V (xa,ya) is determined to not be a defect candidate of a gate open line defect or data open line defect (namely, indicated with an O), and is determined to be a defect candidate of a point defect, gate shorted line defect, data shorted line defect or mura defect candidate (namely, indicated with an X).

In the fourth row from the bottom, in the case the pixel voltage is larger than threshold value Et for point defect candidates and smaller than threshold value Egs for gate shorted line defect candidates, the pixel electrode a2 of the pixel voltage V (xa,ya) is determined to not be a defect candidate of a point defect, gate open line defect or data open line defect (namely, indicated with an O), and determined to be a defect candidate of a gate shorted line defect, data shorted line defect or mura defect (namely, indicated with an X).

In the fifth row from the bottom, in the case the pixel voltage is larger than threshold value Egs for gate shorted line defect candidates and smaller than threshold value Eds for data shorted line defect candidates, the pixel electrode a2 of the pixel voltage V (xa,ya) is determined to not be a defect candidate of a point defect, gate open line defect, gate shorted line defect or data open line defect (namely, indicated with an O), and is determined to be a defect candidate of a data shorted line defect or mura defect (namely, indicated with an X).

Moreover, in the second row from the top, in the case the pixel voltage is larger than threshold value Eds for data shorted line defect candidates and smaller than threshold value Em for mura defect candidates, the pixel electrode a2 of the pixel voltage V (xa,ya) is determined to not be a defect candidate of a point defect, gate open line defect, gate shorted line defect, data open line defect or data shorted line defect (namely, indicated with an O), and is determined to be a defect candidate of a mura defect (namely, indicated with an X).

Here, the processing sequence of the above classification processing of each defect type (Step S34) is intended to improve processing speed. Namely, at the point a defect candidate is judged to be one of the defect types by comparing pixel voltages in order starting with the threshold value farthest away from pixel voltage En of normal pixels, since it is meaningless to compare with a threshold having a larger value than the threshold value of the defect type, comparison processing beyond this point can be omitted. For example, in the case of the bottom row in FIG. 8, the pixel electrode is determined to be a gate open line defect candidate in the comparison with threshold value Ego for gate open line defect candidates. Thus, since it is self-evident that the comparison results with threshold values Edo, Et, Egs, Eds and Em which are closer to normal pixel voltage En than this threshold value Ego correspond to each defect type candidate, processing efficiency can be improved by omitting comparison processing beyond this point, thereby making it possible to shorten data processing time.

Image processing apparatus 8 thus classifies pixel electrodes a2 that have been recognized as defect candidates according to reference threshold value Er based on threshold values Em, Eds, Egs, Et, Edo and Ego for each defect type with respect to all pixel electrodes a2 of a single site, and then registers these classification results in the form of inspection information in an inspection information database (Step S35).

These defect type classification results of defect candidates are registered in an inspection information database as, for example, one bit of data for each pixel electrode a2. As shown in FIG. 9, by writing a "1" in a one bit data region provided for each defect type in the case of corresponding to a defect candidate of the defect type, and a "0" in the case of not corresponding to a defect candidate, for each two-dimensionally arranged pixel electrode a11, a12, a13 . . . (the numeral after the letter "a" indicates the order of arrangement), whether or not each pixel electrode a2 respectively corresponds to a defect candidate for each of the above six types of defect types is registered together with whether or not it is a defect candidate, which are the processing results of the above Step S33.

Furthermore, although an explanation was only provided with respect to processing pertaining to threshold values Em, Eds, Egs, Et, Edo and Ego on the low side of normal pixel voltage En in the explanation of the above Step S34, in actuality, classification and judgment of defect types are also performed by setting threshold values for each defect type with respect to voltages on the high side of normal pixel voltage En, and those results are registered in the inspection information database.

Figure 10:
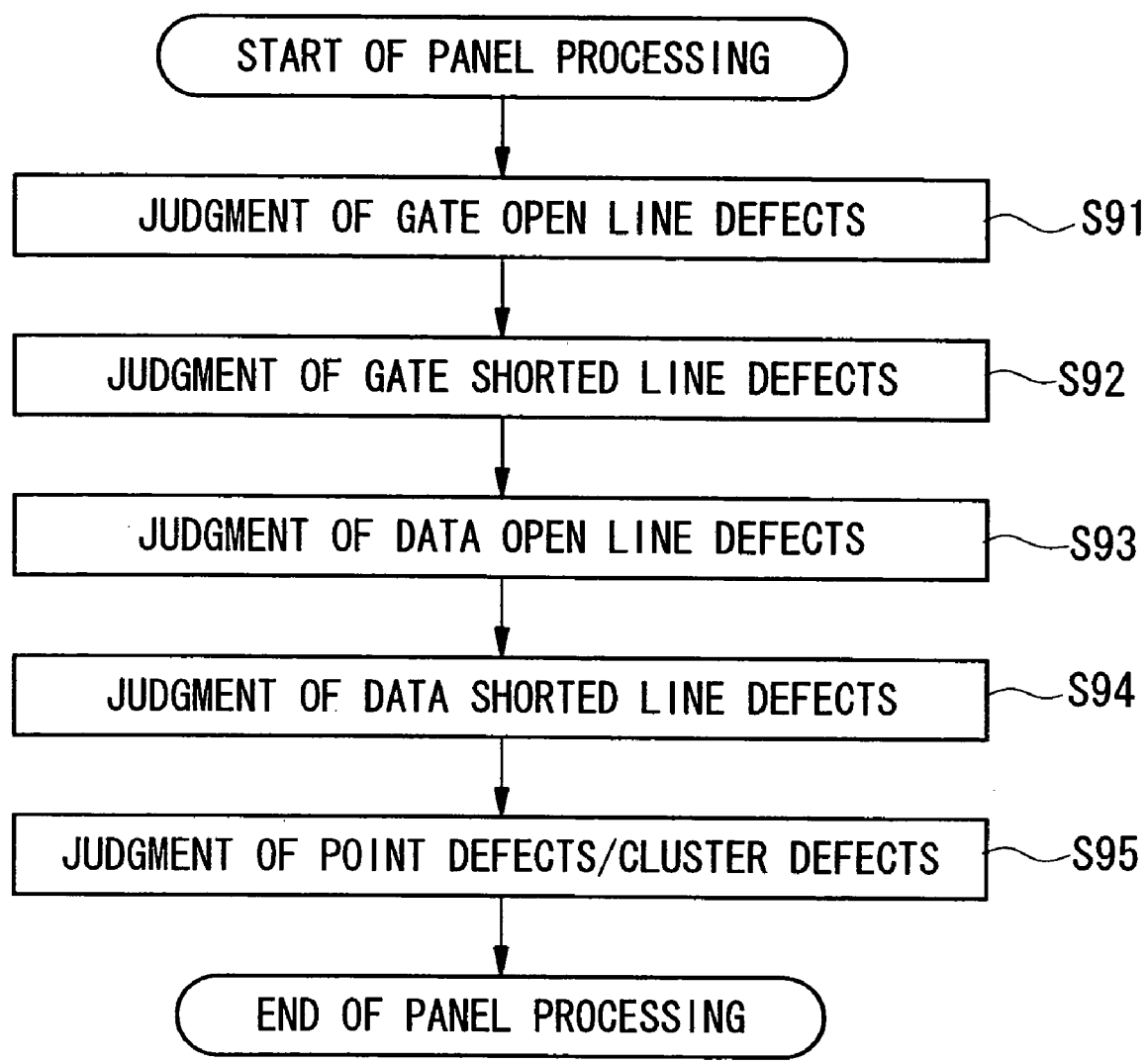
FIG. 10 is a flow chart showing the details of panel processing in one embodiment of the present invention.

Next, an explanation of the details of the above panel processing (Step S9) is provided while following the flow chart shown in FIG. 10. This processing is also executed by image processing apparatus 8 in the same manner as the above site processing.

To begin with, judgment processing of date open line defects is performed based on the judgment results of gate open line defect candidates that are the processing results of the above Step S34 (Step S91). This processing is composed of three types of processing consisting of processing in which pixel electrodes a2 corresponding to gate open line defects are extracted based on the judgment results of gate open line defect candidates (defect element extraction processing), processing in which pixel electrodes a2 extracted by the defect element extraction processing are coupled (defect element coupling processing), and processing in which whether or not pixel electrodes a2 are gate open line defects is finally judged and registered based on the results of the defect element coupling processing (defect judgment and registration processing).

In defect element extraction processing, pixel electrodes a2 corresponding to gate open line defect candidates are extracted by comparing the above threshold value Ego for gate open line defect candidates with pixel voltage for each row and column of pixel electrodes a2 arranged in a plurality of rows and a plurality of columns in the horizontal direction (row direction) and vertical direction (column direction) as shown in FIG. 2. These extraction results are then registered in an inspection information database along with (1) the defective pixel that is the starting point of a plurality of consecutive sections, (2) the defective pixel that is the end point of a plurality of consecutive sections, and (3) the number of defective pixels and so forth.

FIG. 11 shows a schematic representation of the above extraction results corresponding to the arranged positions of pixel electrodes a2. In this drawing, O indicates a pixel electrode a2 that does not correspond to a gate open line defect candidate, while X indicates a pixel electrode a2 that corresponds to a gate open line defect candidate. In the case of this drawing, there is a defect that extends linearly over five consecutive defective pixels in the second column from the right. In addition, a total of ten pixel electrodes a2 have been judged to be defective pixels. Thus, for example, the pixel electrode a2 located at the highest position in the second column from the right is registered in the inspection information database as the starting defective pixel, the pixel electrode a2 located at the lowest position of the above five defective pixels is registered as the ending defective pixel, and the number of defective pixels is registered as "5".

Here, even in the case of, for example, defective pixels being continuous at a plurality of locations of a certain row, the starting defective pixel and ending defective pixel of each location are registered in the inspection information database.

In addition, in defect element coupling processing, (1) locations at which a defective pixel starts from an end pixel electrode a2 and continues for four or more defective pixels (defective pixel groups), (2) defective pixel groups in which a defective pixel ends at an end pixel electrode a2 and continues for four or more defective pixels in the row direction or column direction, and (3) defective pixels groups in which defective pixels are continuous for a prescribed number K1 or more, although a defective pixel does not start or end on an end, are coupled for each row and column based on the above extraction results, and these coupling results are registered in the inspection information database.

Namely, the pixel electrodes a2 surrounded by these defective pixel groups are recognized as defective pixels, and form a series of line defects together with the above defective pixel groups. Furthermore, the number K1 of the above defective pixel group (3) can be specified arbitrarily by means of an operating means equipped in control apparatus 12.

Moreover, in defect judgment and registration processing, pixel electrodes a2 corresponding to gate open line defects are finally judged and registered in the inspection information database based on the results of the above defect element coupling processing and the gate open line defect judgment conditions indicated below.

[Judgment Conditions]
(1) Pixel electrodes a2 in which the direction in which defective pixels are arranged is the row direction, and both ends of the line defective pixels formed by the above coupling are end pixel electrodes a2 are finally judged to be gate open line defects.
(2) Pixel electrodes a2 in which the direction in which defective pixels are arranged is the row direction, and with respect to those in which only one end of the line defective pixels is an end pixel electrode a2, the voltage slope of the pixel voltages of normal pixels on the other end (defect end) and defective pixels is greater than a prescribed voltage slope, are finally judged to be gate open line defects.

In the liquid crystal drive substrate A as shown in FIG. 2, gate lines a4 are lined in the row direction. Namely, in the case a gate line a4 has become open (disconnected) due to some cause, a problem occurs in the operation of TFT a3 arranged in the row direction, and an abnormality occurs in the pixel voltage of pixel electrodes a2 continuous in the row direction that are connected to these TFT a3. Thus, gate open line defects occur in a form in which defective pixels are continuous in the row direction. Furthermore, in the case of a liquid crystal drive substrate in which gate lines a4 are lined in the column direction, defective pixels are naturally in the form of line defects that are continuous in the column direction.

Figure 12:
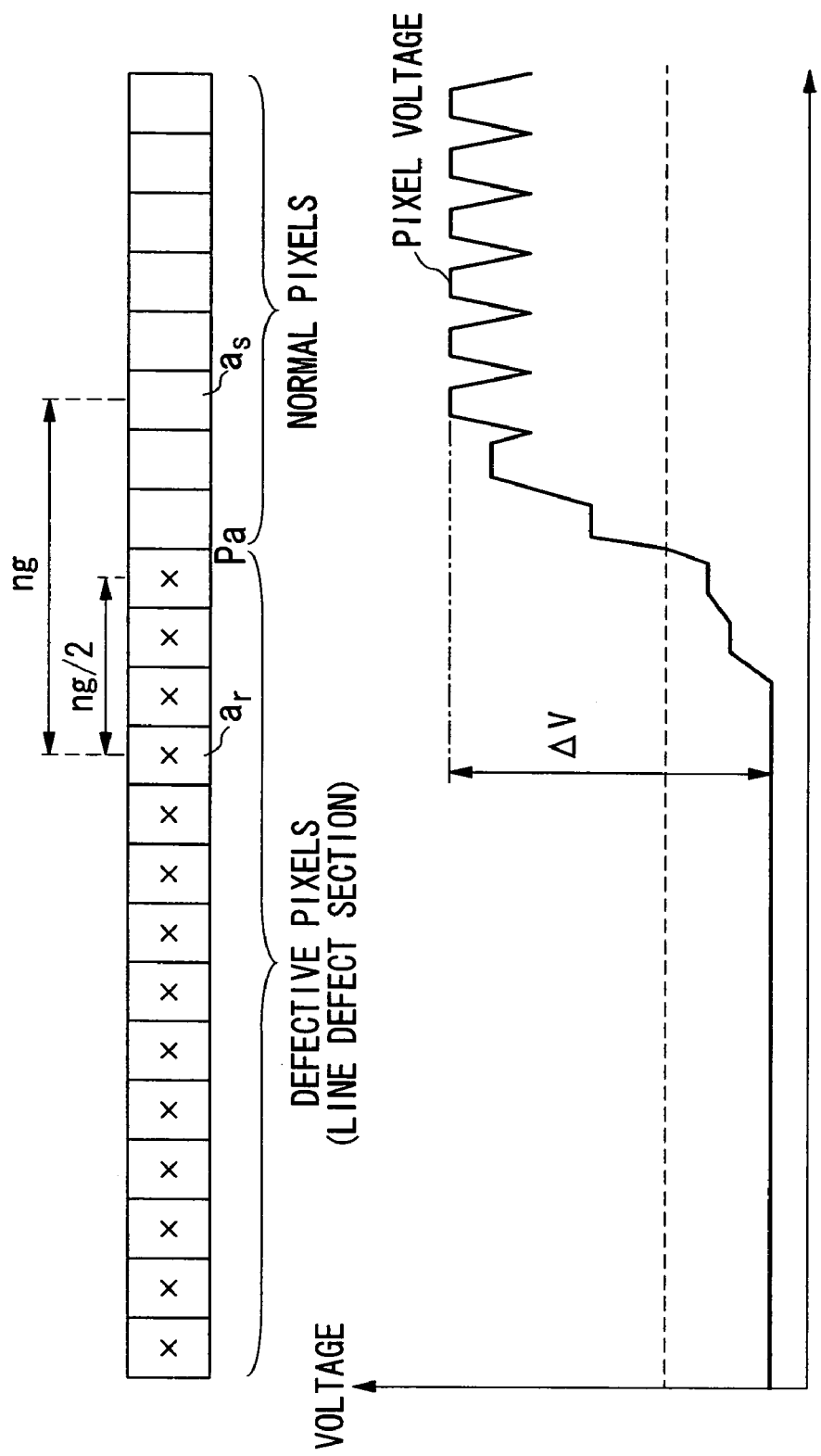
FIG. 12 is an explanatory drawing for explaining the calculation method of voltage slope of defective pixels in panel processing in one embodiment of the present invention.
Figure 14:
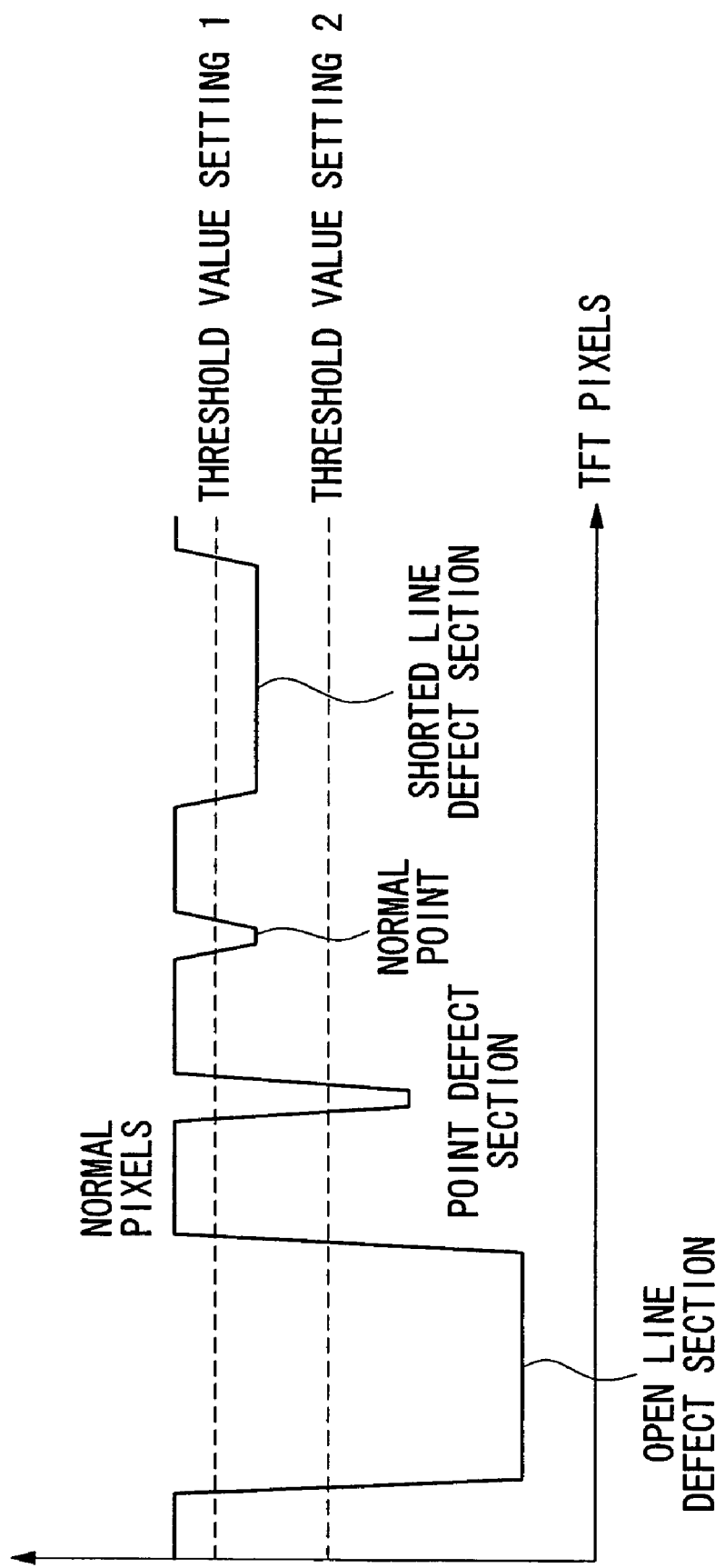
FIG. 14 is an explanatory drawing for explaining the judgment method of defective pixels in the prior art.

In this case, as shown in FIG. 12, a pixel electrode ar on the defect side for calculating the voltage slope based on a specified distance (number of pixels) ng is taken to be a certain defective pixel located at distance ng/2 from the above defective end section Pa, and pixel electrode as on the normal side for calculating voltage slope is taken to be a certain normal pixel located at distance ng/2 from defective end section Pa. The voltage difference $\Delta V$ between each pixel voltage of pixel electrodes ar and as specified in this manner and located at a prescribed distance ng is then calculated as the above voltage slope.

In the case $\Delta V > Es$ when voltage difference $\Delta V$ determined in the above manner is compared with specified reference voltage Es, the line defect section is finally judged to be a gate open line defect. The result of this final judgment is registered in the inspection information database, and judgment processing of the gate open line defect ends. The above specified distance ng and specified reference voltage Es refer are arbitrarily set from an operating means equipped in control apparatus 12.

Furthermore, the five consecutive line defects in the column direction shown in the above FIG. 11 do not satisfy the above judgment conditions (1) and (2). Namely, since this line defect section is not continuous in the row direction, it is not judged to be a gate open line defect.

When evaluation processing of gate open line defects (Step S91) is completed in this manner, judgment processing for gate shorted line defects is carried out in Step S92. This processing is composed of defect element extraction processing in which pixel electrodes a2 corresponding to a gate shorted line defect are extracted based on the judgment results of gate shorted line defect candidates registered in the inspection information database, defect element coupling processing in which pixel electrodes a2 extracted by the defect element extraction processing are coupled, and defect judgment and registration processing in which whether or not pixel electrodes a2 are gate shorted line defects is finally judged and registered based on the results of the defect element coupling processing.

In defect element extraction processing, pixel electrodes a2 corresponding to gate shorted line defect candidates are extracted by comparing the above threshold value Egs for gate shorted line defect candidates with pixel voltage for each row and column of pixel electrodes a2. These extraction results are then registered in an inspection information database along with (1) the defective pixel that is the starting point of a plurality of consecutive sections, (2) the defective pixel that is the end point of a plurality of consecutive sections, and (3) the number of defective pixels and so forth.

In addition, in defect element coupling processing, (1) locations at which a defective pixel starts from an end pixel electrode a2 and continues for four or more defective pixels (defective pixel groups), (2) defective pixel groups in which a defective pixel ends at an end pixel electrode a2 and continues for four or more defective pixels in the row direction or column direction, and (3) defective pixels groups in which defective pixels are continuous for a prescribed number K2 or more, although a defective pixel does not start or end on an end, are coupled for each row and column based on the above extraction results, and these coupling results are registered in the inspection information database.

Namely, the pixel electrodes a2 surrounded by these defective pixel groups are recognized as defective pixels, and form a series of line defects together with the above defective pixel groups. Furthermore, the number K2 of the above defective pixel group (3) can be specified arbitrarily by means of an operating means equipped in control apparatus 12.

Moreover, in defect judgment and registration processing, although pixel electrodes a2 corresponding to gate shorted line defects are finally judged and registered in the inspection information database based on the results of the above defect element coupling processing, this processing is the same as the case of the judgment processing of the previously mentioned gate open line defects (Step S91), and its explanation is omitted here.

Continuing, judgment processing of data open line defects is performed in Step S93. This processing is composed of processing in which pixel electrodes a2 corresponding to a data open line defect are extracted based on the judgment results of data open line defect candidates (Step S34) (defect element extraction processing), processing in which pixel electrodes a2 extracted by the defect element extraction processing are coupled (defect element coupling processing), and defect judgment and registration processing in which whether or not pixel electrodes a2 are data open line defects is finally judged and registered based on the results of the defect element coupling processing.

In defect element extraction processing, pixel electrodes a2 corresponding to data open line defect candidates are extracted by comparing threshold value Edo for data open line defect candidates with pixel voltage for each row and column of pixel electrodes a2. These extraction results are then registered in the inspection information database along with (1) the defective pixel that is the starting point of a plurality of consecutive sections, (2) the defective pixel that is the end point of a plurality of consecutive sections, and (3) the number of defective pixels and so forth.

In addition, in defect element coupling processing, (1) locations at which a defective pixel starts from an end pixel electrode a2 and continues for four or more defective pixels (defective pixel groups), (2) defective pixel groups in which a defective pixel ends at an end pixel electrode a2 and continues for four or more defective pixels in the row direction or column direction, and (3) defective pixels groups in which defective pixels are continuous for a prescribed number K3 or more, although a defective pixel does not start or end on an end, are coupled for each row and column based on the above extraction results, and these coupling results are registered in the inspection information database.

Namely, the pixel electrodes a2 surrounded by these defective pixel groups are recognized as defective pixels, and form a series of line defects together with the above defective pixel groups. Furthermore, the number K3 of the above defective pixel group (3) is specified arbitrarily by means of an operating means of control apparatus 12 in the same manner as the above numbers K1 and K2.

Moreover, in defect judgment processing, pixel electrodes a2 corresponding to data open line defects are finally judged and registered in the inspection information database based on the results of the above defect element coupling processing and the data open line defect judgment conditions indicated below.

[Judgment Conditions]
(1) Pixel electrodes a2 in which the direction in which defective pixels are arranged is the column direction, and both ends of the line defective pixels formed by the above coupling are end pixel electrodes a2 are finally judged to be data open line defects.
(2) Pixel electrodes a2 in which the direction in which defective pixels are arranged is the column direction, and with respect to those in which only one end of the line defective pixels is an end pixel electrode a2, the voltage slope of the pixel voltages of normal pixels on the other end (defect end) and defective pixels is greater than a prescribed voltage slope, are finally judged to be data open line defects. Furthermore, the calculation method of voltage slope is the same as in the previously mentioned judgment processing of gate open line defects (Step S91), and its explanation is omitted here.

As has been described above, in liquid crystal drive substrate A of FIG. 2, data lines a5 are lined in the column direction. Namely, in the case a data line a5 has become open (disconnected) due to some cause, a problem occurs in the operation of TFT a3 arranged in the column direction, and an abnormality occurs in the pixel voltage of pixel electrodes a2 continuous in the column direction that are connected to these TFT a3.

Thus, data open line defects occur in a form in which defective pixels are continuous in the column direction. Furthermore, in the case of a liquid crystal drive substrate in which data lines a5 are lined in the row direction, defective pixels are naturally in the form of line defects that are continuous in the row direction. Five consecutive in the column direction shown in the above FIG. 11 satisfy the above judgment conditions (1) and (2), and are judged to be data open line defects.

Moreover, data shorted line defect judgment processing is performed in Step S94. This processing is composed of processing in which pixel electrodes a2 corresponding to a data shorted line defect are extracted based on the judgment results of gate shorted line defect candidates (Step S34) (defect element extraction processing), processing in which pixel electrodes a2 extracted by the defect element extraction processing are coupled (defect element coupling processing), and defect judgment and registration processing in which whether or not pixel electrodes a2 are data shorted line defects is finally judged and registered based on the results of the defect element coupling processing.

In defect element extraction processing, pixel electrodes a2 corresponding to data shorted line defect candidates are extracted by comparing the above threshold value Eds for data shorted line defect candidates with pixel voltage for each row and column of pixel electrodes a2. These extraction results are then registered in the inspection information database along with (1) the defective pixel that is the starting point of a plurality of consecutive sections, (2) the defective pixel that is the end point of a plurality of consecutive sections, and (3) the number of defective pixels and so forth.

In addition, in defect element coupling processing, (1) locations at which a defective pixel starts from an end pixel electrode a2 and continues for four or more defective pixels (defective pixel groups), (2) defective pixel groups in which a defective pixel ends at an end pixel electrode a2 and continues for four or more defective pixels in the row direction or column direction, and (3) defective pixels groups in which defective pixels are continuous for a prescribed number K4 or more, although a defective pixel does not start or end on an end, are coupled for each row and column based on the above extraction results, and these coupling results are registered in the inspection information database.

Namely, the pixel electrodes a2 surrounded by these defective pixel groups are recognized as defective pixels, and form a series of line defects together with the above defective pixel groups. Furthermore, the number K4 of the above defective pixel group (3) is specified arbitrarily by means of an operating means of control apparatus 12 in the same manner as the above numbers K1 through K3.

Moreover, in defect judgment and registration processing, pixel electrodes a2 corresponding to data shorted line defects are finally judged and registered in the inspection information database based on the results of the above defect element coupling processing.

[Judgment Conditions]
(1) Pixel electrodes a2 in which the direction in which defective pixels are arranged is the column direction, and both ends of the line defective pixels formed by the above coupling are end pixel electrodes a2 are finally judged to be data shorted line defects.

(2) Pixel electrodes a2 in which the direction in which defective pixels are arranged is the column direction, and with respect to those in which only one end of the line defective pixels is an end pixel electrode a2, the voltage slope of the pixel voltages of normal pixels on the other end (defect end) and defective pixels is greater than a prescribed voltage slope, are finally judged to be data shorted line defects.

Furthermore, the calculation method of voltage slope is the same as in the previously mentioned judgment processing of gate shorted line defects (Step S91), and its explanation is omitted here.

Continuing, in the panel processing, judgment processing of point defects and cluster defects is carried out in Step S95. This processing is composed of (1) defect element extraction processing, (2) grouping processing, and (3) judgment and registration processing.

In defect element extraction processing, judgment targets of point and cluster defects are extracted based on pixel electrodes a2 classified as point defect candidates or cluster defect candidates in the above Step S34. Namely, pixel electrodes a2 that were not judged to be line defects in Steps S91 through S94 for defect judgment processing of defect type pertaining to each of the above line defects are extracted as judgment targets of point and cluster defects.

In this line defect judgment processing, pixel electrodes a2 that was inherently not a defect candidate according to defect element coupling processing are judged to be defective pixels that compose a portion of a line defect. Thus, in extraction processing defect elements pertaining to point defects and cluster defects, those pixel electrodes a2 judged to be defective pixels that compose a line defect in the above defect judgment processing Steps S91 through S94 from pixel electrodes a2 classified as point defect candidates or cluster defect candidates in Step S34 are excluded from defect elements pertaining to point defects or cluster defects.

In grouping processing, the processing results of this defect element extraction processing are grouped based on the number of consecutive defective pixels. Namely, consecutive defective pixels in the column direction, row direction and diagonal direction are grouped into 1 through L according to the number of defective pixels. For example, a defective pixel consisting of a single isolated point is grouped into one-point defects, defective pixels consisting of a total of two defective pixels in the column direction, row direction or diagonal direction are grouped into two-point defects, defective pixels consisting of a total of three consecutive defective pixels in the column direction, row direction or diagonal direction are grouped into three-point defects; and defective pixels consisting of a total of L consecutive defective pixels in the column direction, row direction or diagonal direction are grouped into L-point defects.

In judgment and registration processing, isolated defects and consecutive defects grouped in this manner are classified into point defects and cluster defects based on the number of consecutive defects, and these classification results are registered in the inspection information database.

Figure 13:
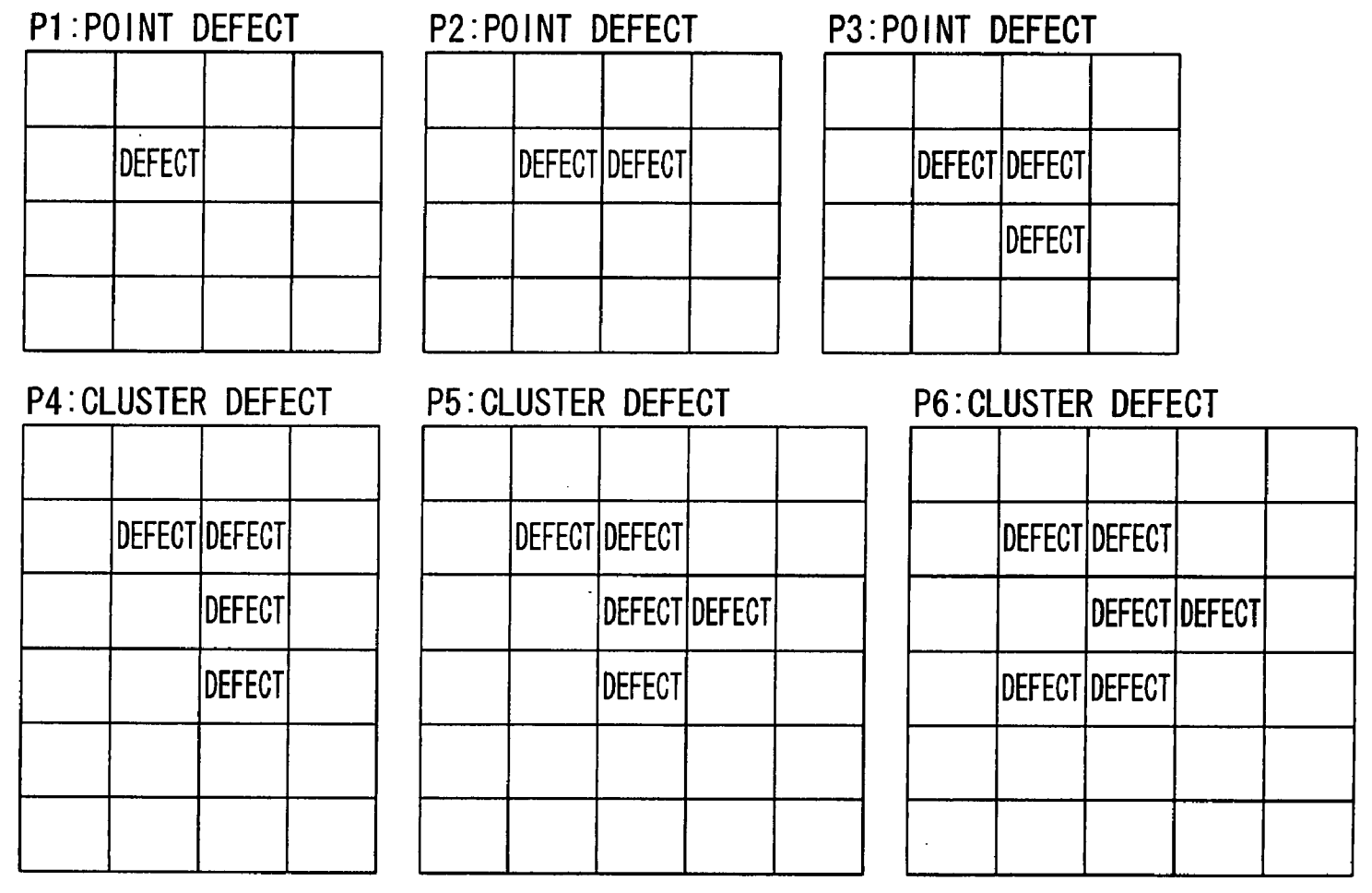

FIG. 13 shows an example of point defects and cluster defects judged in this manner. In this drawing, defect pattern P1 indicates a one-point defect, defect pattern P2 indicates a two-point defect in which there are a total of two consecutive defective pixels, defect pattern P3 indicates a three-point defect in which there are a total of three consecutive pixel defects in the column direction, row direction or diagonal direction, defect pattern P4 indicates a four-point defect in which there are a total of four consecutive pixel defects in the column direction, row direction or diagonal direction, defect pattern P5 indicates a five-point defect in which there are a total of five consecutive pixel defects in the column direction, row direction or diagonal direction, and defect pattern P6 indicates a six-point defect in which there a total of six consecutive pixel defects in the column direction, row direction or diagonal direction.

In the present embodiment, among these defect patterns P1 through P6, defect patterns P1 through P3, namely one- to three-point pixel defects are classified and judged to be point defects, while defect patterns P4 through P6, namely four- to six-point defects, are classified and judged to be cluster defects. Namely, in judgment processing of the point defects and cluster defects (Step S95), consecutive defective pixels within the range of 1 to 3 defective pixels is the judgment condition for point defects, while consecutive defective pixels within the range of four or more defective pixels is the judgment condition for cluster defects.

When judgment processing of point defects and cluster defects is completed in this manner, panel processing for a single liquid crystal drive substrate A is completed. This panel processing is carried out in the exact same manner for each of the above liquid crystal drive substrates A1 through A4, and the inspection results of glass substrate B composed of the liquid crystal drive substrates A1 through A4 are displayed on monitor 9. Furthermore, in the present embodiment, judgment processing of mura defects is not performed. Thus, defect information pertaining to mura defects is not included in the inspection results.

The following effects are offered by the present embodiment:

(1) Defect candidates of each defect type are classified and judged using defect candidate threshold values provided for each defect type, and defective pixels of each defect type are finally judged based on these classification and judgment results. Thus, in comparison with the case of judging defect candidates using a single defect candidate threshold value as in the prior art, together with it being possible to improve the defect judgment accuracy with respect to the pixel voltage of each pixel electrode a2, the judgment accuracy of defect type can also be improved.

(2) In addition, as a result of site processing being carried out during the time liquid crystal drive substrate A is moving between sites with respect to modulator 1, increases in inspection time due to increases in the amount of data processed can be inhibited by providing a defect candidate threshold value for each defect type or performing panel processing during movement between liquid crystal drive substrates A on glass substrate B, thereby making it possible to suppress reductions in throughput pertaining to inspection of liquid crystal drive substrates A.

(3) Since defect types are judged by comparing pixel voltage in order starting from the defect candidate threshold value farthest away from pixel voltage En of normal pixels, classification and processing of defect type can be carried out efficiently. Thus, increases in inspection time due to increases in the amount of data processed can be suppressed.

Furthermore, although the explanation of the above embodiment dealt with the inspection of liquid crystal drive substrates A1 through A4 in the form of four substrates being formed on glass substrate B, the invention of the present application is not limited to this. The present invention can also be applied to the case of inspecting that in which a single liquid crystal drive substrate is formed on a glass substrate. In addition, the present invention can also be applied to the case of comparatively small liquid crystal drive substrates in which all of the pixel electrodes are in planar opposition with modulator 1 at once.

What is claimed:

1. An inspection apparatus for liquid crystal drive substrates that discriminates defective pixels having an abnormal voltage and normal pixels having a normal voltage based on pixel voltage by arranging an electro-optical element plate in opposition to a liquid crystal drive substrate on which pixel electrodes are arranged in the form of a matrix, and calculating the actual voltage of each pixel electrode in the form of a pixel voltage based on the voltage image of the electro-optical element plate obtained by writing a prescribed voltage to the pixel electrodes, and on the electro-optical characteristics of the above electro-optical element plate, wherein the inspection apparatus comprises an image processing apparatus that classifies pixel electrodes of defect candidates for each defect type by comparing said pixel voltage with a threshold value set for each defect type of pixel defect, and finally judges said pixel electrodes of defect candidates for each defect type as defective pixels of each defect type based on judgment conditions provided for each defect type.

2. An inspection apparatus for liquid crystal drive substrates according to claim 1, wherein the image processing apparatus is composed so that pixel voltage is sequentially compared starting with a threshold value set for each defective pixel defect type that is farther removed from the pixel voltage of normal pixels, and comparison with the next threshold value is omitted at the point it is judged to be a defect candidate in comparison with a certain threshold value.

* * * * *